Oct. 7, 1969     D. A. FREDENBURG     3,471,828
SONAR TRANSDUCER CAGE
Filed Nov. 1, 1967
FIG. 1
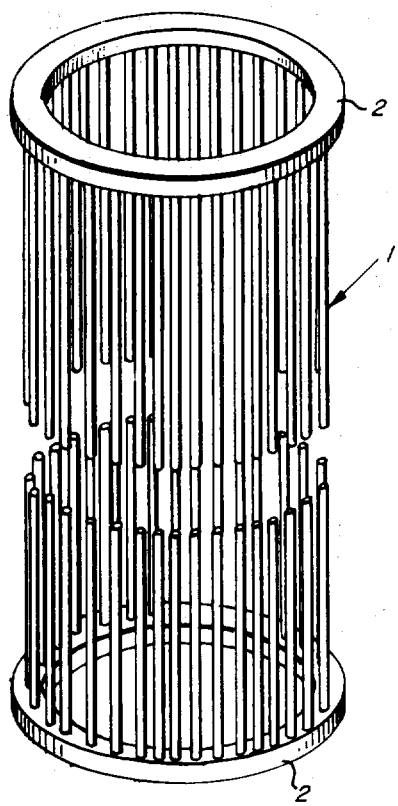
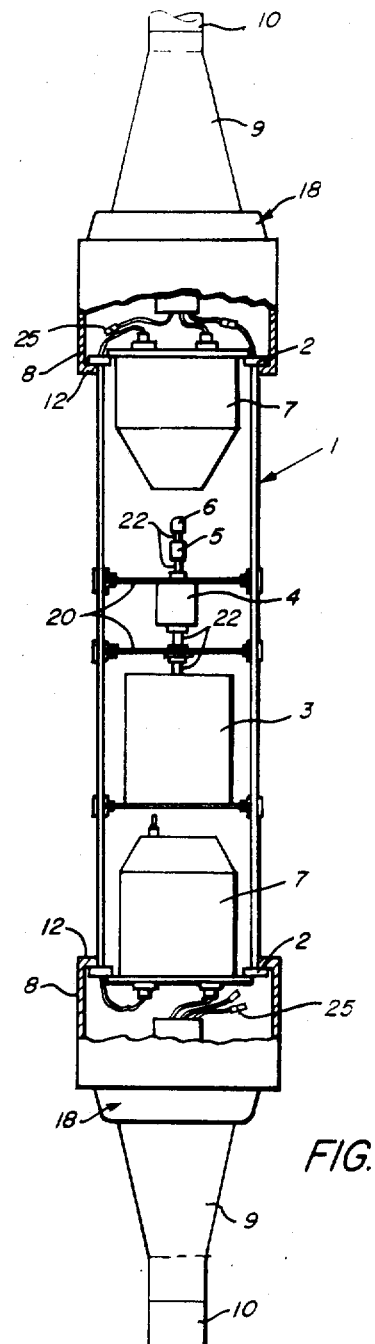
FIG. 2
FIG. 3
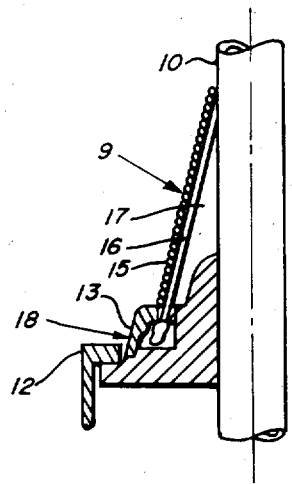
INVENTOR
DONALD A. FREDENBURG
BY Robert Bruce Brodie
ATTORNEY

United States Patent Office 3,471,828
Patented Oct. 7, 1969

3,471,828
SONAR TRANSDUCER CAGE
Donald A. Fredenburg, Bristol, R.I., assignor to Raytheon Company, Lexington, Mass., a corporation of Delaware
Filed Nov. 1, 1967, Ser. No. 679,802
Int. Cl. H04b 13/00; G10k 11/00
U.S. Cl. 340—8                                 3 Claims

ABSTRACT OF THE DISCLOSURE

A suspension system for the axial mounting of underwater transducers intermediate or terminating the extent of a multiconductor cable. The system comprises a cylindrical cage formed from a plurality of spaced hollow rigid strength members for mounting the transducers therein. The cage is insertably mounted along the cable length coextensive with its main axis. Mechanical coupling means for strain relief are affixed to the respective ends of the cage for its axial coupling to the cable and further for coupling a predetermined number of cable conductors through corresponding hollow rigid strength members thereby effectuating a bypass thereof.

Background of the invention

This invention relates to sonar transducer cages and, more particularly, to a suspension system for the axial mounting of underwater transducers intermediate or terminating the extent of a multiconductor cable.

In the prior art in order to mount underwater transducers along the axis of a multiconductor cable, it was necessary to resort to an array of transducer elements surrounding the cable or to transducer elements outrigger mounted from the cable. The mounting of the transducers with respect to a cable is critical at high frequencies because interference with acoustic propagation is more acute as a function of the shorter wavelengths interacting with support structures. Illustrative of acoustic interference is that of the cable casting an acoustic shadow in the field of the transducer, reflections among support members, and turbulence.

Reference is made to U.S. Patent 2,762,032 issued on Sept. 4, 1956 to C. B. Vogel. This reference shows a clamp-on cage surrounding a multiconductor cable. As such, it may be attached intermediate the multiconductor cable extent as well, of course, as terminating a cable.

The clamp-on cage does not axially mount the transducer. A compass device is thus necessary to detect where in the azimuth plane the transducer is with respect to the cable. Furthermore, there are the shadow effects of the cable which vary as a function of the angle of an incident acoustic wave with respect to a transducer. It is, of course, necessary to recognize that the shadow effects are functions of the cable thickness.

It is accordingly an object of this invention to devise a suspension system for the axial mounting of underwater transducers intermediate or terminating the extent of a multiconductor cable.

It is a related object of this invention to devise such a suspension system which minimizes the acoustic interference of the multiconductor cable and further is substantially acoustically transparent.

Summary of the invention

The objects of this invention are satisfied by a suspension system comprising a cylindrical cage formed from a plurality of spaced hollow rigid strength members for mounting the transducers therein. The cage is insertably mounted along the cable extent coextensive with the main axis of the cage. A mechanical arrangement affixed to the respective ends of the cage axially couples the cage to the cable. This mechanical arrangement also couples a predetermined number of the cable conductors through one or more of the hollow rigid strength members thus effecting a bypass. Axial mounting of the transducers may thus be effected and any shadow effects caused by diameter of the cable become distributed among the substantially small diameter hollow rigid strength members. The acoustic permeability of a cylindrical cage over a broad range of operating acoustic frequencies is maintained if the diameter of each of the rigid strength members is less than each linear dimension of the axially mounted transducers.

Brief description of the drawings

FIG. 1 shows the cage supporting structure.

FIG. 2 shows the cage supporting structure with the transducers mounted therein and the use of split cylinder strain members for securing the cage to the taut wire.

FIG. 3 is a detailed view of the cylinder strain member terminating the taut wire.

Description of the preferred embodiment

In FIG. 1 a cylindrical cage structure is shown in which hollow rigid strength members 1 are uniformly spaced apart and secured in end rings 2. The hollow members 1 carry the tensile load and also pass electrical conductors (not shown) which may be either connected to transducers or completely bypass the suspension system and leading to the other cages in series with the multiconductor cable. Such a configuration mechanically eases the maintenance of the electrical continuity of conductors in the taut wire. The hollow tubes are equally spaced to present a symmetrical surface to acoustic transmission at the highest wanted frequency, resulting in approximate acoustic transparency.

In FIG. 2 the multiconductor cable 10 is shown terminated in the cage structure 1. At each end of the cage structure there is a split cylinder strain member 8. This strain member transfers the tensile load from the cage structure to the multiconductor cable 10. Transducers 3, 4, 5, and 6 are shown axially mounted on longitudinally extending support members 22 within the cage structure. Transverse members 20 affixed to the rigid support elements 1 provide lateral support to the transducers 3, 4, 5, and 6. Significantly, the diameter of each hollow rigid strength member should be less than each linear dimension of each transducer in order to minimize the acoustic interference of the support members.

The types of transducers which may be mounted in the cage structure are varied. For example, transducer 3 may be a low frequency acoustic transmitter. Transducer 6 may be a hydrophone for reception up to high frequencies. Element 7 may be an electronics housing. The electronics housing 7 shown in FIG. 2 is tapered so as to minimize internal acoustic wave reflection between transducers within the cage structure. The transducers are optimally spaced apart along the longitudinal extent of the cage structure. This longitudinal spacing apart varies with the sizes and shapes of the transducers within the structure. It is necessary to redistribute the transducers in order to eliminate shadowing over a sufficiently wide elevation angle. This elevation angle is a range of angles of arrival over which an acoustic may be incident upon a transducer. A typical angular value extends between ±60°.

It will be noticed that space is contained within the split cylinder strain member 8 sufficient to house conductors from each hollow cage member and a plug connector 25 for terminating the electrical conducting elements of taut wire 10. FIG. 3 is a more detailed view of the split cylinder strain member coupling. The split cylinder coupling rigidly joins end ring 2 and cable strain relief housing 18. The cable strain relief housing portion of the coupling 9 includes a hand wrapped taper 17 surrounded by armour wire 16 terminating in sleeve 11 which anchors the wire 16 within an opening provided therefor in housing 18. A slotted cable retainer portion 14 secures the wire and assembly within a retaining ring 13 on housing 18. A lip on the strain relief housing 18 secures the split cylinder 12. The bolts (not shown) holding the coupling together carry no cable tension loads, but merely maintain the split cylinders and clamps in position.

For preferred operation, each linear dimension of a transducer should be less than the diameter of the taut wire for minimization of acoustic shadowing and turbulence.

In summary, a suspension system for the axial mounting of underwater transducers has been shown and described. The system comprises a taut wire and a cage structure adapted to mount transducers therein. The cage structure is interposed along the taut wire length and is formed from spaced rigid strength members.

I claim:

1. A suspension system for the axial mounting of underwater transducers intermediate or terminating the extent of a multiconductor cable comprising:

a cylindrical cage formed from a plurality of spaced hollow rigid strength members for mounting the transducers therein, each linear dimension defining the geometrical shape of each transducer and being greater than the diameter of each hollow rigid strength member, the cage being insertibly mounted along the cable length coextensive with the main axis of the cage; and means affixed to the respective ends of the cage for axially coupling a predetermined number of cable transducers through one or more hollow rigid strength members.

2. A suspension system for the axial mounting of underwater transducers intermediate or terminating the extent of a multiconductor cable comprising:

a cylindrical cage for mounting transducers therein formed from a plurality of spaced hollow rigid strength members and interposed along the multiconductor cable length between adjacent end portions thereof and coextensive with the main axis of the cage, the diameter of each hollow rigid strength member being less than each linear dimension of each transducer; and means affixed to the respective ends of the cage for axially coupling the cage to the cable ends and including means for coupling a predetermined number of cable conductors through one or more hollow rigid strength members.

3. A suspension system according to claim 2, wherein the cylindrical cage further comprises:

a first and second end ring securing the hollow rigid strength members at their ends and spacing them along a circumference at approximately equal intervals; the interval spacing between being greater than the acoustic wavelength of interest.

References Cited

UNITED STATES PATENTS

| | | |
|---|---|---|
| 2,405,605 | 8/1946 | Goodale et al. |
| 2,762,032 | 9/1956 | Vogel _____ 340—10 |
| 2,930,912 | 3/1960 | Miller. |
| 3,056,589 | 10/1962 | Daniel _____ 340—10 X |
| 3,233,213 | 2/1966 | Harris _____ 340—10 X |
| 3,328,752 | 6/1967 | Sims _____ 340—10 |
| 2,708,485 | 5/1955 | Vogel _____ 340—17 X |

RODNEY D. BENNETT, JR., Primary Examiner

B. L. RIBANDO, Assistant Examiner

U.S. Cl. X.R.

181—.5